United States Patent
Yamamoto

(10) Patent No.: US 11,928,142 B2
(45) Date of Patent: Mar. 12, 2024

(54) INFORMATION PROCESSING APPARATUS AND INFORMATION PROCESSING METHOD

(71) Applicant: Sony Group Corporation, Tokyo (JP)

(72) Inventor: Masahiro Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 339 days.

(21) Appl. No.: 17/423,905

(22) PCT Filed: Dec. 23, 2019

(86) PCT No.: PCT/JP2019/050245
§ 371 (c)(1),
(2) Date: Jul. 19, 2021

(87) PCT Pub. No.: WO2020/170593
PCT Pub. Date: Aug. 27, 2020

(65) Prior Publication Data
US 2022/0083580 A1    Mar. 17, 2022

(30) Foreign Application Priority Data
Feb. 18, 2019  (JP) .................. 2019-026904

(51) Int. Cl.
*G06F 16/35* (2019.01)
*G06F 18/214* (2023.01)
*G06N 20/00* (2019.01)

(52) U.S. Cl.
CPC .......... *G06F 16/35* (2019.01); *G06F 18/2148* (2023.01); *G06N 20/00* (2019.01)

(58) Field of Classification Search
CPC ...... G06F 16/35; G06F 18/2148; G06N 20/00
See application file for complete search history.

(56) References Cited

U.S. PATENT DOCUMENTS

| | | | |
|---|---|---|---|
| 9,678,957 B2 * | 6/2017 | Cormack | G06N 20/00 |
| 10,657,158 B2 * | 5/2020 | Sheng | G06F 16/93 |
| 10,762,390 B2 * | 9/2020 | Can | G06F 18/24 |
| 11,138,518 B1 * | 10/2021 | Yu | G06F 9/44526 |
| 11,263,277 B1 * | 3/2022 | Podgorny | G06F 16/3329 |

(Continued)

FOREIGN PATENT DOCUMENTS

JP    07-192010 A    7/1995

OTHER PUBLICATIONS

International Search Report and Written Opinion dated Mar. 17, 2020, received for PCT Application PCT/JP2019/050245, Filed on Dec. 23, 2019, 17 pages including English Translation.

(Continued)

*Primary Examiner* — Huawen A Peng
(74) *Attorney, Agent, or Firm* — XSENSUS LLP

(57) ABSTRACT

An information processing apparatus according to the present disclosure includes a reception unit that receives pre-training data that is data used for pre-training in machine learning, and a search condition for similar pre-training data that is data similar to the pre-training data, a search unit that searches for similar pre-training data in accordance with the search condition, and a generation unit that performs pre-training based on the retrieved similar pre-training data, and generates a trained model by using a result obtained through the pre-training.

13 Claims, 13 Drawing Sheets

(56) References Cited

U.S. PATENT DOCUMENTS

| | | | | |
|---|---|---|---|---|
| 11,687,712 B2* | 6/2023 | Ishikawa | ............... | G06F 40/284 |
| | | | | 704/9 |
| 2012/0124037 A1* | 5/2012 | Lee | ....................... | G06F 16/432 |
| | | | | 707/E17.084 |
| 2015/0324451 A1* | 11/2015 | Cormack | ............... | G06N 20/00 |
| | | | | 706/11 |
| 2018/0121539 A1* | 5/2018 | Ciulla | ................. | G06F 16/3344 |
| 2018/0285730 A1* | 10/2018 | Zhao | ..................... | H04L 67/535 |
| 2018/0330511 A1* | 11/2018 | Ha | ........................... | G06F 30/00 |
| 2019/0102697 A1* | 4/2019 | Casalonga | ............. | G06N 20/00 |
| 2021/0174021 A1* | 6/2021 | Ishikawa | ............... | G06F 40/284 |

OTHER PUBLICATIONS

Howard et al., "Universal Language Model Fine-Tuning for Text Classification", Proceedings of the 56th Annual Meeting of the Association for Computational Linguistics (Long Papers), Jul. 15-20, 2018, pp. 328-339.

Venkatesh, "Accelerating Information Retrieval using Natural Language Processing", International Journal of Computer Science Trends and Technology (IJCST), vol. 6, Issue 3, May-Jun. 2018, 23 pages.

Devlin et al., "BERT: Pre-training of Deep Bidirectional Transformers for Language Understanding", arXiv:1810.04805v2, May 24, 2019, 16 pages.

* cited by examiner

INFORMATION PROCESSING APPARATUS AND INFORMATION PROCESSING METHOD

CROSS-REFERENCE TO RELATED APPLICATIONS

The present application is based on PCT filing PCT/JP2019/050245, filed Dec. 23, 2019, which claims priority to JP 2019-026904, filed Feb. 18, 2019, the entire contents of each are incorporated herein by reference.

FIELD

The present disclosure relates to an information processing apparatus and an information processing method. More specifically, the present disclosure relates to a process of automatically searching for pre-training data that is used to generate a model.

BACKGROUND

In various technical fields, a neural network that mimics a mechanism of a brain nervous system is used. For example, models for solving various problems are generated through learning using the neural network.

In the learning using the neural network, a technique of what is called pre-training is known, in which weights or the like of nodes included in a model are learned in advance by using general-purpose data before performing training for solving a problem. Appropriate pre-training improves performance of a model that is generated through training that is performed after the pre-training.

CITATION LIST

Patent Literature

Non Patent Literature 1: Jeremy Howard, Sebastian Ruder, "Universal Language Model Fine-tuning for Text Classification", ACL2018.
Non Patent Literature 2: Jacob Devlin, Ming-Wei Chang, Kenton Lee, Kristina Toutanova, "BERT: Pre-training of Deep Bidirectional Transformers for Language Understanding", Arxiv2018.

SUMMARY

Technical Problem

In the conventional technology, a model related to a natural language processing field is caused to perform pre-training on general-purpose data in order to improve accuracy of a model for solving a specific problem.

Meanwhile, if a specific field to be solved by a trained model is limited, it is expected to further improve performance of the model by performing pre-training using not only general-purpose data, but also data in the specific field. However, it is difficult to prepare a large amount of data in the specific field as described above, and in some cases, it may be difficult to perform pre-training effectively.

To cope with this, the present disclosure proposes an information processing apparatus and an information processing method capable of improving effects of pre-training.

Solution to Problem

According to the present disclosure, an information processing apparatus includes a reception unit that receives pre-training data that is data used for pre-training in machine learning, and a search condition for similar pre-training data that is data similar to the pre-training data; a search unit that searches for similar pre-training data in accordance with the search condition; and a generation unit that performs pre-training based on the retrieved similar pre-training data, and generates a trained model by using a result obtained through the pre-training.

DESCRIPTION OF EMBODIMENTS

Embodiments of the present disclosure will be described in detail below based on the drawings. In each of the embodiments below, the same components will be denoted by the same reference symbols, and repeated explanation of the components will be omitted.

In addition, hereinafter, the present disclosure will be explained in the following order.
1. Embodiments
  1-1. Example of information processing according to embodiment
  1-2. Configuration of information processing apparatus according to embodiment
  1-3. Flow of information processing according to embodiment
  1-4. Modifications of embodiments
    1-4-1. Operation as information processing system
    1-4-2. Application to processing other than natural language processing
    1-4-3. Application to model other than classification model 2. Other embodiments
3. Effects of information processing apparatus according to present disclosure
4. Hardware configuration

1. Embodiment

1-1. Example of Information Processing According to Embodiment

Figure 1:
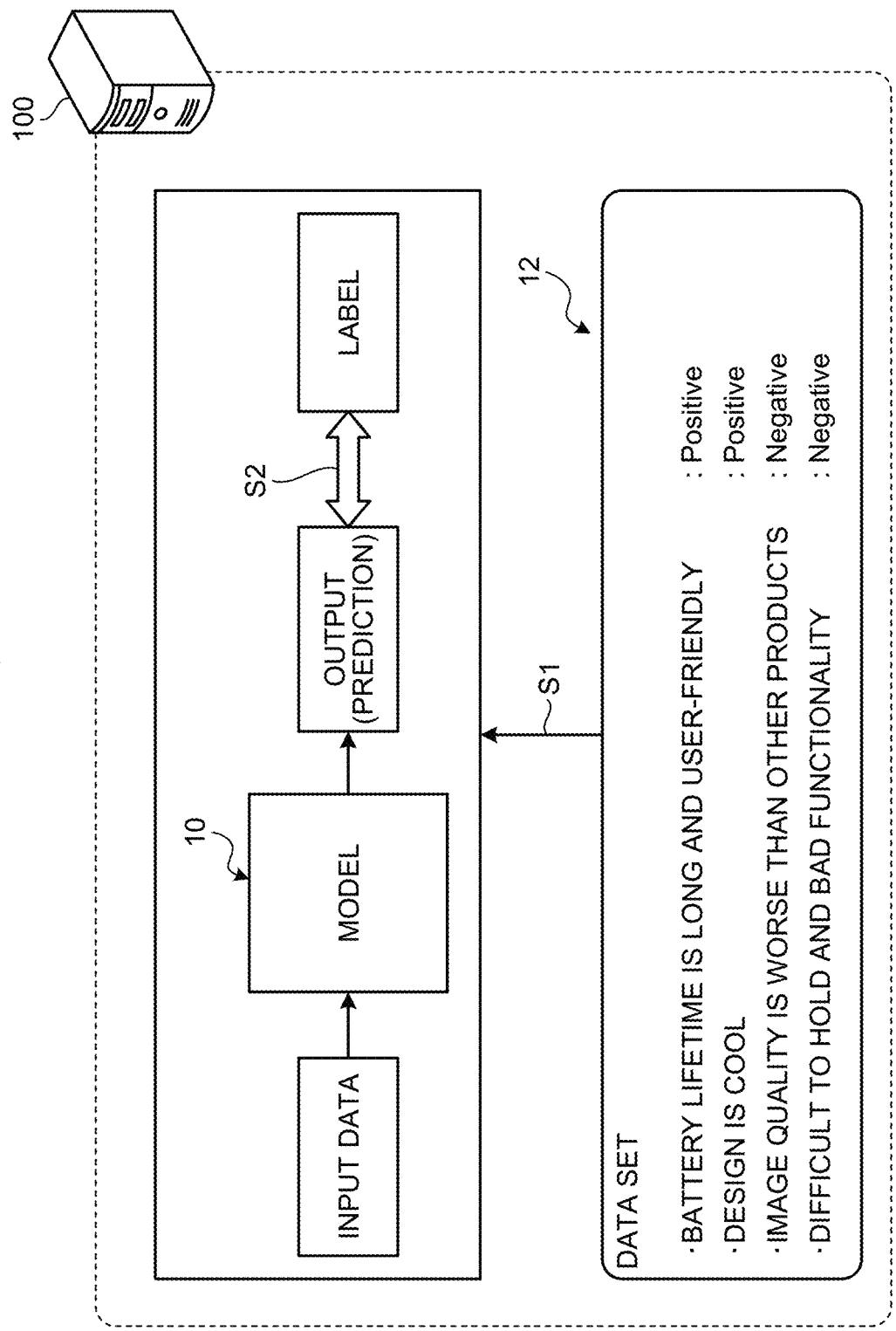
FIG. 1 is a diagram schematically illustrating a model generation process according to an embodiment.

FIG. 1 is a diagram schematically illustrating a model generation process according to an embodiment. Model generation according to the present disclosure is performed by an information processing apparatus 100 illustrated in FIG. 1. The information processing apparatus 100 is an apparatus that performs information processing according to the present disclosure and is, for example, a server apparatus, a personal computer (PC), or the like.

In the embodiment, as a model according to the present disclosure, a trained model that is generated through machine learning is described as an example. Specifically, the model according to the present disclosure is trained by using what is called a neural network that mimics a human brain neural circuit.

A model 10 illustrated in FIG. 1 is what is called a classification model that classifies input data that is a processing target into two values. The model 10 according to the embodiment is trained by using a data set 12 that is text data.

In the example in FIG. 1, it is assumed that the model 10 learns a process of classifying whether the input data is a "favorable expression (positive)" or an "unfavorable expression (negative)" through what is called supervised learning. For example, in the embodiment, the model 10 is trained for the purpose of classifying whether a review for a camera in a user review site or the like on the Web is favorable or unfavorable.

First, the information processing apparatus 100 acquires the data set 12 as training data (Step S1). Then, if text data of "battery lifetime is long and user-friendly" in the data set 12 is input to the model 10, the information processing apparatus 100 outputs (predicts) a certain value. For example, the information processing apparatus 100 outputs "0.6" as probability that the input text data is "positive". In this case, teaching data for the input text data is "positive" and a value of a correct answer (a value that is labeled in advance) is "1", so that there is an error between the output value and the label. The information processing apparatus 100 performs training such that the error between the output value and the label is reduced (Step S2), and trains the model 10.

The information processing apparatus 100 is able to generate the model 10 that classifies whether the input data is "positive" or "negative" by repeating the process as described above by using the text data included in the data set 12. Meanwhile, in FIG. 1, four kinds of text data are illustrated as examples of data included in the data set 12, but in reality, the data set 12 includes a larger number of pieces of text data. In general, classification performance of the model 10 is improved with an increase in the number of pieces of data (text data and a label indicating whether each piece of text data is a correct answers or an incorrect answer) included in the data set 12.

Meanwhile, when the classification model related to language processing as described above with reference to FIG. 1 is to be generated, it is known that, by performing pre-training related to a language, it is possible to improve accuracy of the model to be generated and reduce a training time related to classification.

Figure 2:
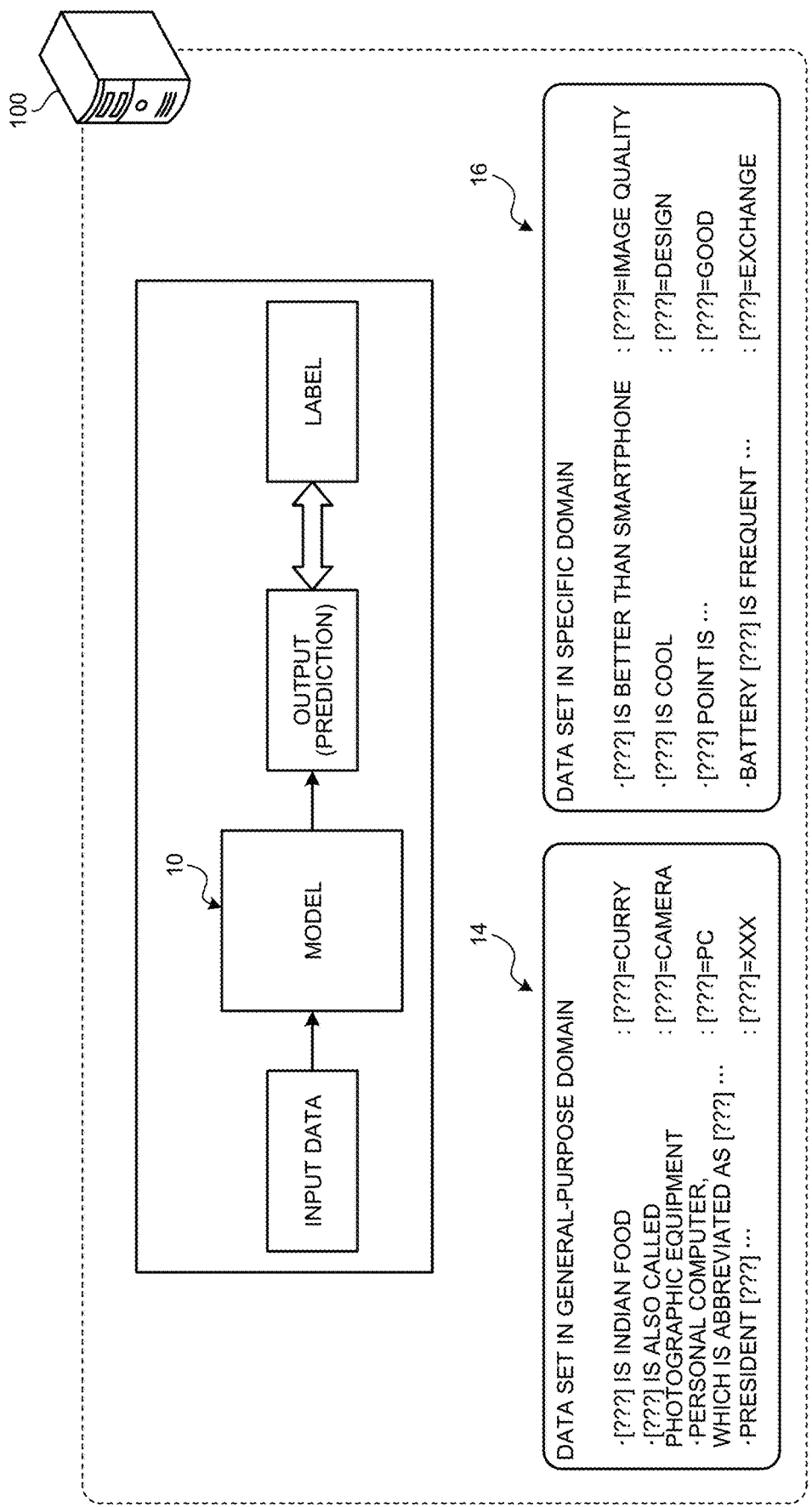
FIG. 2 is a diagram for explaining pre-training according to the embodiment.

The pre-training will be described with reference to FIG. 2. FIG. 2 is a diagram for explaining the pre-training according to the embodiment. FIG. 2 illustrates a data set 14 and a data set 16 that are used for pre-training before the model 10 trains a target process (in the embodiment, classification of text data).

The data set 14 is a data set in a general-purpose domain. The general-purpose domain is a text data group for which a specific field is not defined among pieces of training data related to the language processing. For example, the data set in the general-purpose domain is generated based on a text data group that is obtained by randomly crawling a web network.

The data set 14 includes a plurality of pieces of data (hereinafter, referred to as "pre-training data") for which processing or the like for performing pre-training on the model 10 is performed in accordance with a target process of the model 10. In the embodiment, because the model 10 performs language processing, such as classification of text data, the data set 14 includes text data for which a process suitable for pre-training for performing the language processing is performed. Specifically, pre-training data included in the data set 14 is data as a pair of text data of a sentence, a part of which is hidden (masked), and a correct answer of the text data.

The information processing apparatus 100 performs pre-training using the pre-training data included in the data set 14 before learning a classification process as illustrated in FIG. 1. Specifically, the information processing apparatus 100 performs supervised learning to guess a phrase (in this example, a correct answer data is "curry") that is to be inserted in a masked portion ([???]) in text data of "[???] is Indian food". Through the pre-training, the information processing apparatus 100 is able to obtain, as an initial structure of the model 10, a structure in which a weight value related to a certain level of language processing is set, instead of a structure with a randomly set weight value.

Further, it is known that accuracy of the model 10 is further improved by performing pre-training using only a phrase that is related to the target process of the model 10 after performing the pre-training in the general-purpose domain.

In the embodiment, a domain that includes a content related to the target process of the model 10 will be referred to as a "specific domain". For example, the general-purpose domain is a document (text) that is randomly extracted, whereas the specific domain is a document that is related to a content to be classified by the model 10.

As illustrated in FIG. 1, the model 10 is a model for classifying the user review for the camera, and therefore, the specific domain in this case is a content related to the camera, for example. Therefore, pre-training data included in the data set 16 in the specific domain is data that is partly hidden similarly to the pre-training data in the data set 14, and is text data that is related to the camera. The pre-training data in the specific domain is collected by, for example, a user who uses the model 10. Meanwhile, as described above, the specific domain indicates a field related to the target process of the model 10, and the general-purpose domain indicates a field that is not limited to only the field related to the target process of the model 10; however, distinction between the domains is relative and need not be absolute. For example, the general-purpose domain need not always indicate all fields, but is satisfactory if the general-purpose domain indicates a field that may include the specific domain and that corresponds to a broader concept than the specific domain.

The information processing apparatus 100 further performs pre-training using the pre-training data included in the data set 16 that is the specific domain after the pre-training in the general-purpose domain is performed. With this configuration, the information processing apparatus 100 is able to perform pre-training for further improving the classification performance, as compared to performing only the pre-training in the general-purpose domain.

Figure 3:
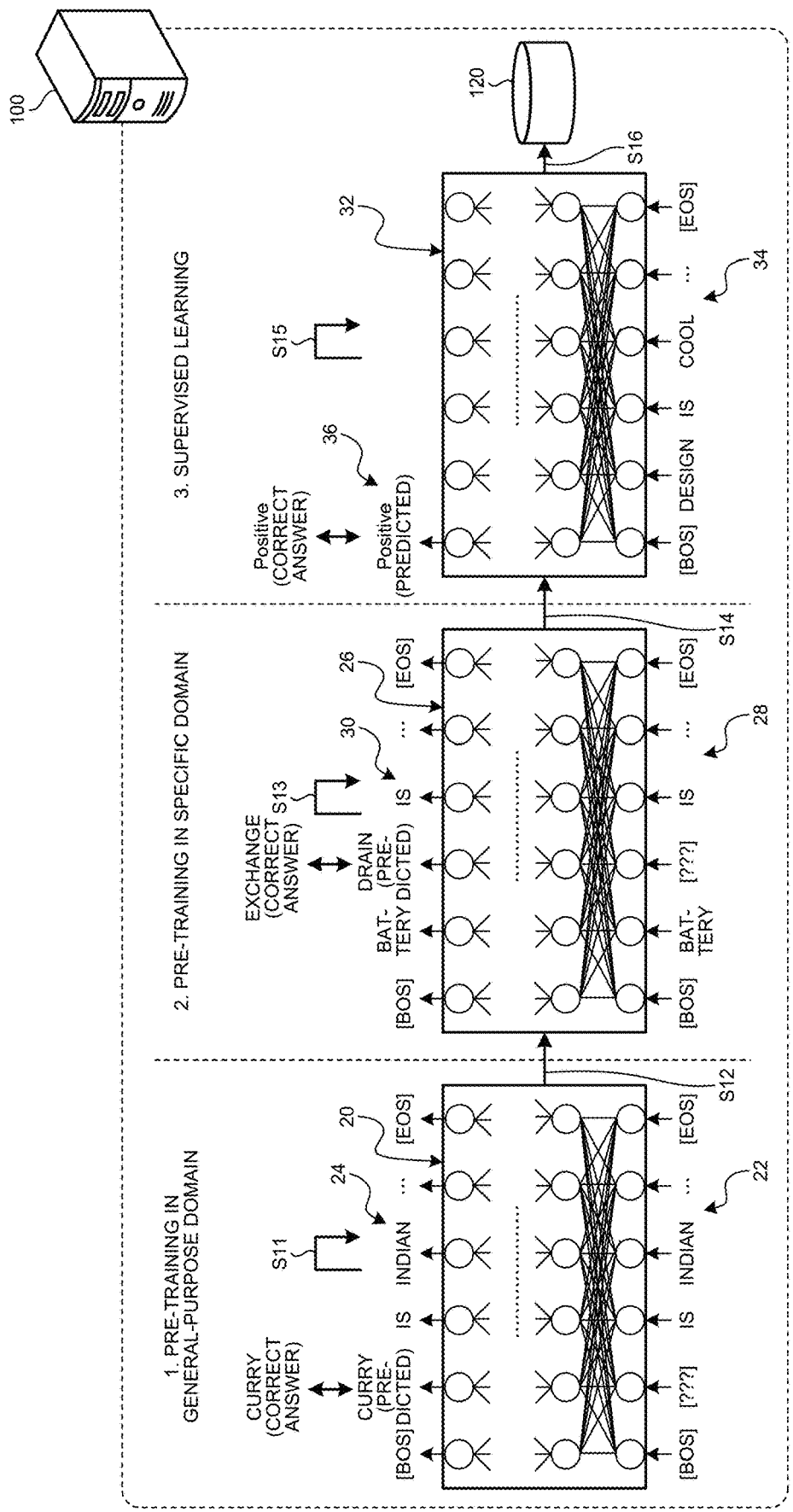
FIG. 3 is a diagram schematically illustrating the flow of a learning process according to the embodiment.

A flow of the learning process described above with reference to FIG. 1 and FIG. 2 will be schematically explained below with reference to FIG. 3. FIG. 3 is a diagram schematically illustrating the flow of the learning process according to the embodiment.

As illustrated in FIG. 3, the information processing apparatus 100 prepares a model 20 that has a basic structure. For example, the information processing apparatus 100 receives, from a user, designation of a structure of a basic neural network that is suitable for a process (in this example, a document classification process) that is requested by the user, and determines the structure of the model 20.

Thereafter, the information processing apparatus 100 performs pre-training in the general-purpose domain with respect to the model 20 (Step S11). Specifically, the information processing apparatus 100 inputs, as pre-training data, text data 22 that is partly masked to the model 20. The text data 22 is, for example, text data that is included in the data set 14 in the general-purpose domain as illustrated in FIG. 2. Meanwhile, "BOS" illustrated in FIG. 3 is a pseudo token (begin of sentence) that indicates a head of a sentence. Further, "EOS" is a pseudo token (end of sentence) that indicates an end of the sentence.

Upon input of the text data 22, the model 20 outputs text data 24 in which the masked portion is filled through a prediction process. For example, the model 20 outputs the text data 24 including text of "curry is Indian . . . ". In this case, it is assumed that the model 20 has predicted "curry" as a phrase that is filled in the masked portion. The information processing apparatus 100 compares "curry" that is correct answer data with the output "curry", gives a reward if the answer is correct, and corrects an error if the answer is incorrect, thereby training the model 20.

Upon completion of the pre-training in the general-purpose domain, the information processing apparatus 100 passes a parameter (weight value) that is learned in the model 20 to a model 26 (Step S12).

Subsequently, the information processing apparatus 100 performs pre-training in the specific domain with respect to the model 26 that has received the parameter (Step S13). In other words, the information processing apparatus 100 uses, as pre-training data, data that belongs to a certain domain (specific domain) that is the same with or similar to processing target data to be used in a final classification process. For example, the information processing apparatus 100 inputs text data 28 that is partly masked to the model 26. The text data 28 is, for example, text data that is included in the data set 16 in the specific domain as illustrated in FIG. 2.

Upon input of the text data 28, the model 26 outputs text data 30 in which the masked portion is filled through a prediction process. For example, the model 26 outputs the text data 30 including text of "battery drain . . . ". In this case, it is assumed that the model 26 has predicted "drain" as a phrase that is filled in the masked portion. The information processing apparatus 100 compares "exchange" that is a correct answer data with the output "drain", gives a reward if the answer is correct, and corrects an error if the answer is incorrect, thereby training the model 26.

Upon completion of the pre-training in the specific domain, the information processing apparatus 100 passes a parameter (weight value) that is learned in the model 26 to a model 32 (Step S14).

Subsequently, the information processing apparatus 100 performs supervised learning on the classification process or the like, with respect to the model 32 that has received the parameter (Step S15). For example, the information processing apparatus 100 inputs text data 34 that is a target for the classification process to the model 32, and causes the model 32 to output a value indicating whether the text data 34 is classified as "positive" or "negative".

Then, the information processing apparatus 100 compares output 36 of the model 32 and correct answer data that is labeled in advance, and trains the model 32. For example, the information processing apparatus 100 compares "positive" that is the correct answer data and a value (in this example, "positive") indicated by the output 36, gives a reward if the answer is correct, and corrects an error if the answer is incorrect, thereby training the model 32. After completion of the training, the information processing apparatus 100 stores the trained model 32 in a storage unit 120 (Step S16).

In this manner, the information processing apparatus 100 is able to generate the model 32 with high accuracy by first performing pre-training in the general-purpose domain and the specific domain and thereafter performing training on the classification process or the like that is an intended purpose.

Here, it is possible to easily obtain pre-training data in the general-purpose domain by using the web network, an electronic encyclopedia, or the like. However, it is necessary for a user who is going to generate a model to collect pre-training data in the specific domain because the pre-training data in the specific domain needs to be prepared in accordance with a final target process of the model. Further, to improve effects of machine learning, such as a neural network, it is preferable to prepare a larger number of pieces of pre-training data, but it is difficult for the user to collect pieces of data related to the specific domain.

To cope with this, the information processing apparatus 100 improves effects of the pre-training in the specific domain by performing the information processing according to the present disclosure. Specifically, the information processing apparatus 100 receives, from the user, pre-training data that is data used in pre-training and a search condition for similar pre-training data that is data similar to the pre-training data. The information processing apparatus 100 subsequently searches for the similar-pre-training data, which is the data similar to the pre-training data, in accordance with the received search condition. Further, the information processing apparatus 100 performs pre-training based on the retrieved similar pre-training data, and generates a model corresponding to the machine learning by using a result obtained through the pre-training.

In other words, the information processing apparatus 100 receives sample pre-training data and the search condition from the user, and collects a large number of pieces of data that can be used for the pre-training by searching for data similar to the pre-training data. Therefore, even if only a small amount of pre-training data is present for a specific task that is to be processed by the model, the information processing apparatus 100 performs an automatic search based on the data and performs training, so that it is possible to improve effects of the pre-training.

Figure 4:
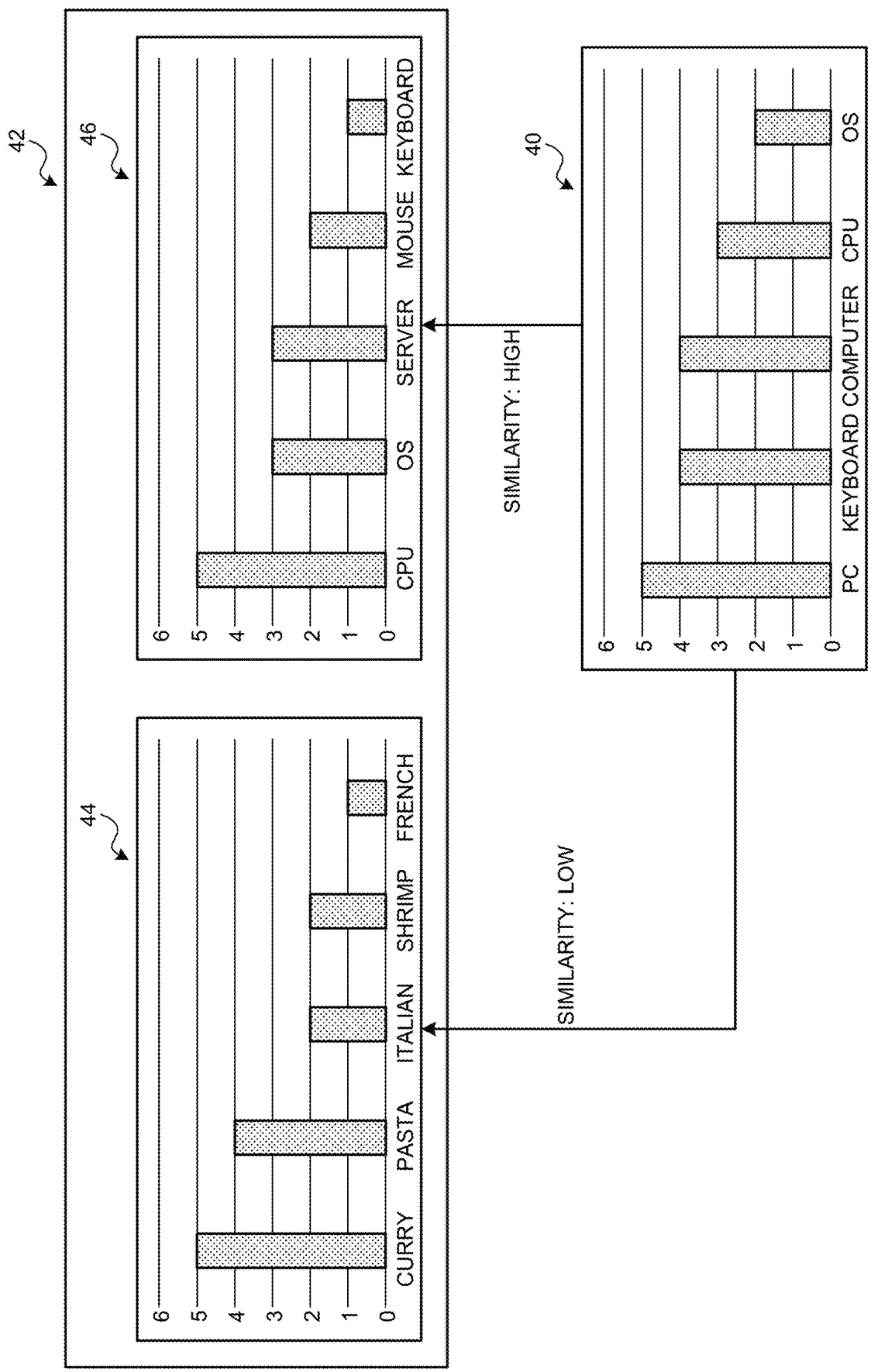
FIG. 4 is a diagram for explaining a similarity of pre-training data.

A similarity of the pre-training data will be descried below with reference to FIG. 4. FIG. 4 is a diagram for explaining the similarity of the pre-training data.

In the example illustrated in FIG. 4, upon receiving sample pre-training data from the user, the information processing apparatus 100 analyzes a distribution of words included in the sample pre-training data. A graph 40 illustrated in FIG. 4 represents a distribution of words included in the sample pre-training data. The graph 40 is obtained by performing morphological analysis on a document that is the pre-training data, and conceptually making a graph of the distribution of words. Meanwhile, a vertical axis of the graph 40 may be the number of appearances of a word, a rate of appearance of a word in the document, or importance of a word in the document. In this case, the information processing apparatus 100 may calculate the importance or the like of a word in the pre-training data by using a well-known technology, such as term frequency, inverse document frequency (tf-idf).

Further, the information processing apparatus 100 performs the same analysis on a document in which the similar pre-training data that is similar to the sample pre-training data is to be searched for. Meanwhile, the information processing apparatus 100 may collect, as the document in which the similar pre-training data is to be searched for, data by crawling the web network or from a database of arbitrary corpus data or the like, for example.

The information processing apparatus 100 stores, as collected data 42, a result of an analysis on the document in which the similar pre-training data is to be searched for. In the collected data 42, a graph 44 illustrated in FIG. 4 represents an analysis result of a word distribution in an exemplary document that is a target candidate for the similar pre-training data. Further, a graph 46 illustrated in FIG. 4 represents an analysis result of a word distribution in another exemplary document that is a target candidate for the similar pre-training data.

The information processing apparatus 100 calculates a similarity between a document corresponding to the graph 40 and a document corresponding to the graph 44 or the graph 46, and searches for the similar pre-training data that is similar to the document represented by the graph 40, on the basis of the calculated similarity. While details will be described later, the information processing apparatus 100 obtains, for example, a cosine similarity between a vector that represents an analysis result of the document corresponding to the graph 40 and a vector that represents an analysis result of the document corresponding to the graph 44 or the graph 46. Then, the information processing apparatus 100 calculates a similarity between the documents on the basis of the obtained cosine similarity. With this configuration, the information processing apparatus 100 is able to search for the similar pre-training data that is similar to the sample pre-training data from among enormous amounts of data, such as documents on the web network.

Meanwhile, the search condition as described above is, for example, setting of an upper limit number or a lower limit number of pieces of similar pre-training data to be searched for. As described above, in the training process, it is preferable to perform pre-training on a large number of pieces of data, but in some cases, even if a large amount of data with low similarities are prepared, effects of the training is not improved. Therefore, by receiving a condition, such as the upper limit number or the lower limit number, for the similar pre-training data to be searched for from the user, the information processing apparatus 100 adjusts the number of pieces of similar pre-training data to be searched for, and performs adjustment such that training is performed as desired by the user.

In the search process as described above, the information processing apparatus 100 may provide, for example, a user interface to the user and receive the pre-training data and the search condition. This will be described below with reference to FIG. 5 to FIG. 8.

Figure 5:
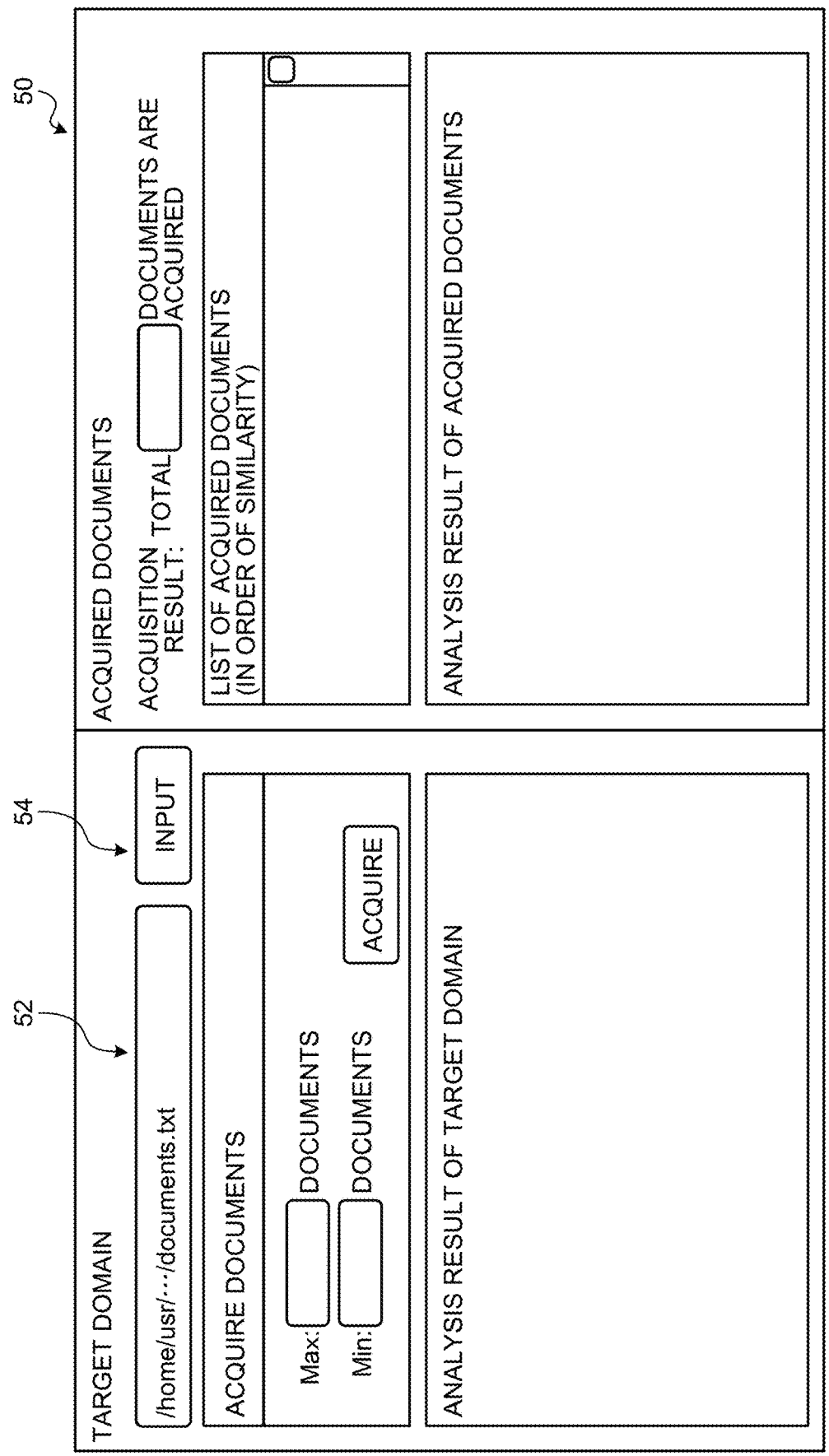
FIG. 5 is a diagram (1) illustrating a user interface according to the embodiment.

FIG. 5 is a diagram (1) illustrating a user interface according to the embodiment. A user interface 50 illustrated in FIG. 5 is displayed on, for example, a display or the like that is connected to the information processing apparatus 100.

The user designates, on the user interface 50, a data file or the like that the user wants to designate as the specific domain. Specifically, the user inputs a path for designating a document of the sample pre-training data in a box 52. Then, the user presses an input button 54 in the user interface 50. Accordingly, the information processing apparatus 100 is able to receive the sample pre-training data from the user. Meanwhile, the information processing apparatus 100 may receive a plurality of pieces of sample pre-training data.

Figure 6:
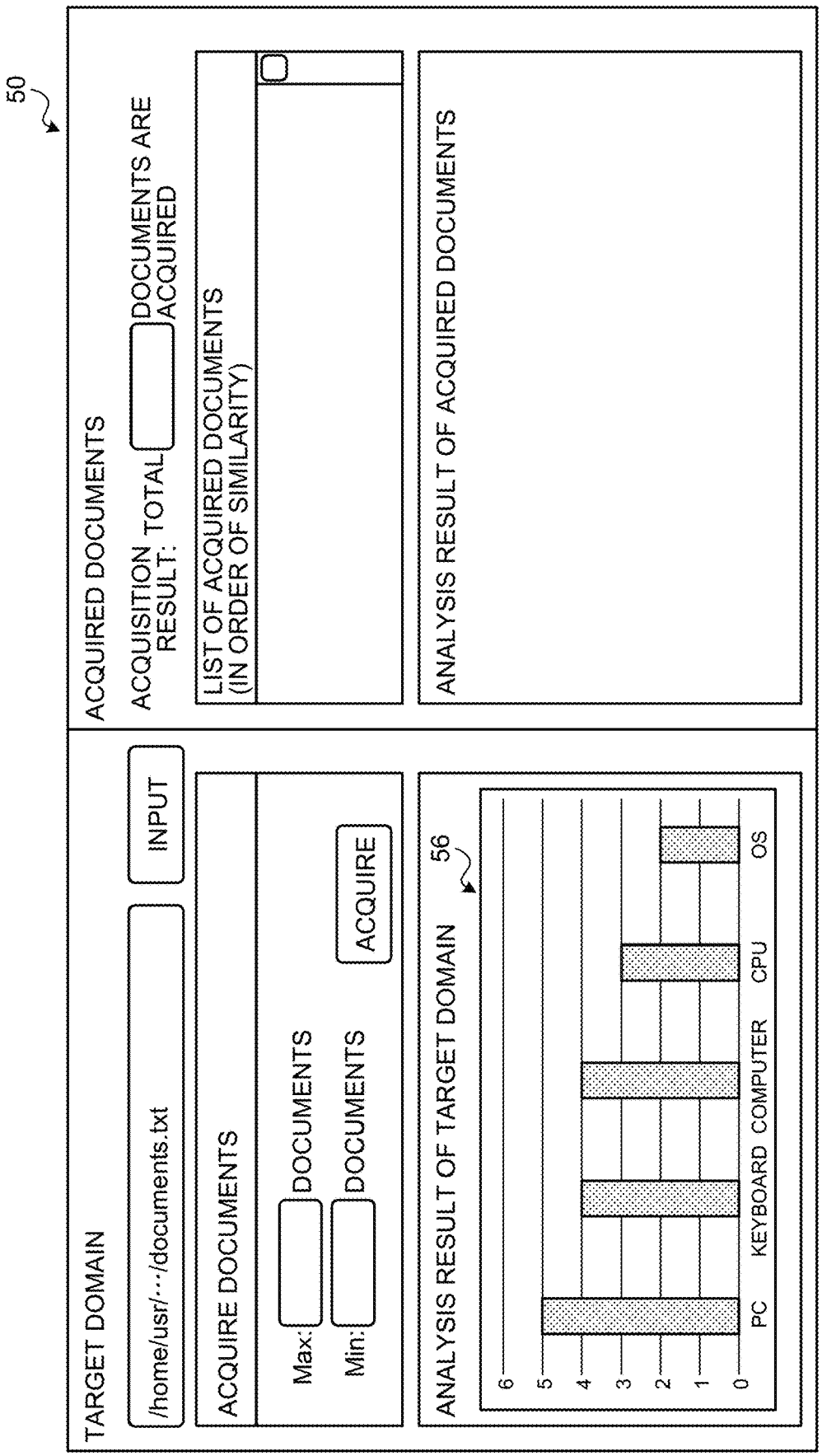
FIG. 6 is a diagram (2) illustrating the user interface according to the embodiment.

Upon receiving the sample pre-training data, the information processing apparatus 100 analyzes the received pre-training data. This will be described below with reference to FIG. 6. FIG. 6 is a diagram (2) illustrating the user interface according to the embodiment.

As illustrated in FIG. 6, the information processing apparatus 100 displays a graph 56 that is an analysis result of the sample pre-training data on the user interface 50. Accordingly, the user is able to check, at a glance, a word distribution of the sample pre-training data, so that the user is able to determine whether the document that is selected as the sample pre-training data is correct. If the user wants to change the sample pre-training data, the user newly inputs a different file via the user interface 50.

Figure 7:
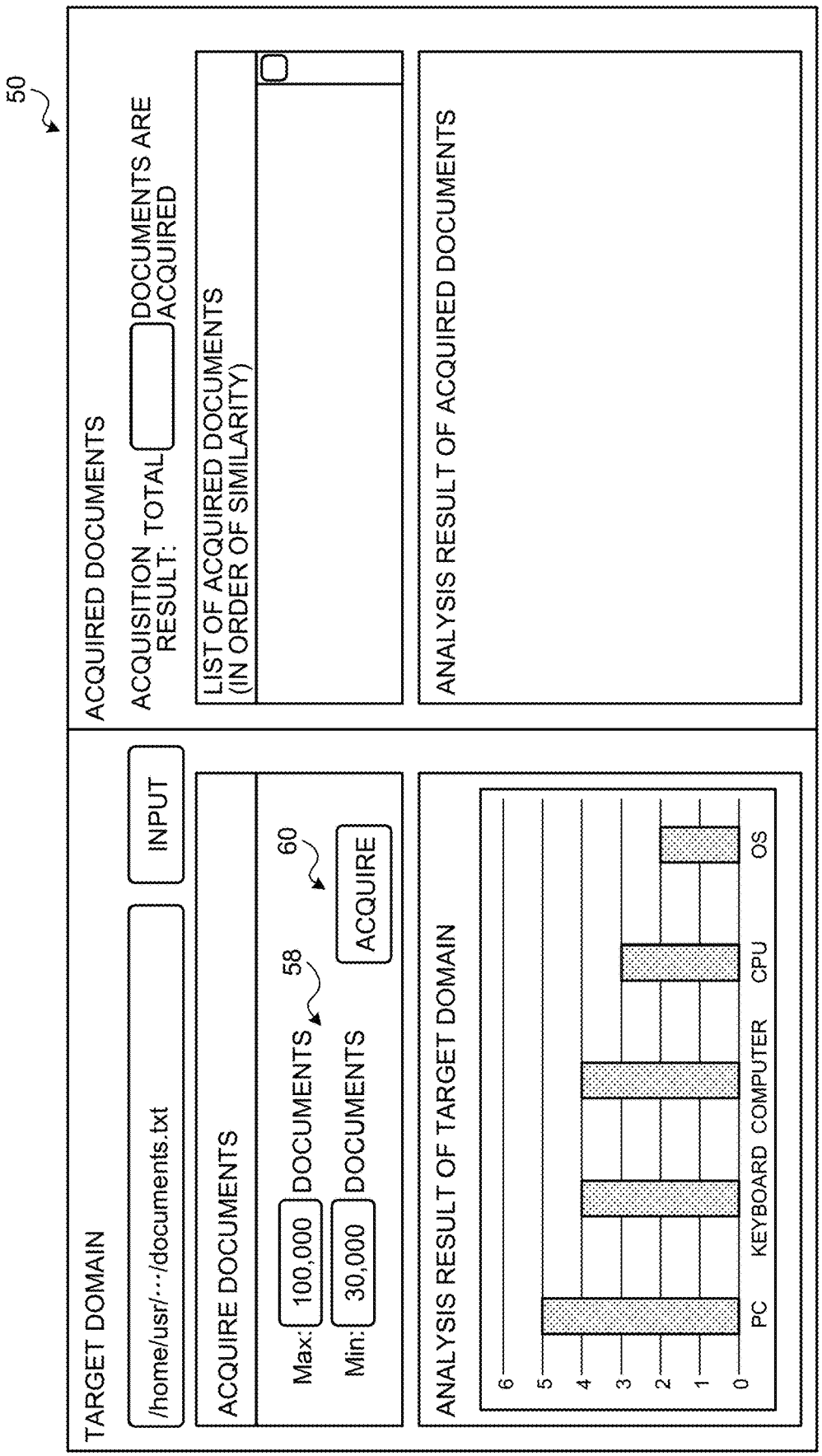
FIG. 7 is a diagram (3) illustrating the user interface according to the embodiment.

Subsequently, the information processing apparatus 100 receives a search condition for the similar pre-training data from the user. This will be described below with reference to FIG. 7. FIG. 7 is a diagram (3) illustrating the user interface according to the embodiment.

As illustrated in FIG. 7, the user inputs, in boxes 58 on the user interface 50, values for designating an upper limit number and a lower limit number of documents (similar pre-training data) to be acquired. In the example in FIG. 7, the user designates "100,000" as the upper limit number and designates "30,000" as the lower limit number.

Subsequently, the user presses an acquisition button 60. Accordingly, the information processing apparatus 100 receives the search condition and a request to search for the similar pre-training data from the user.

Figure 8:
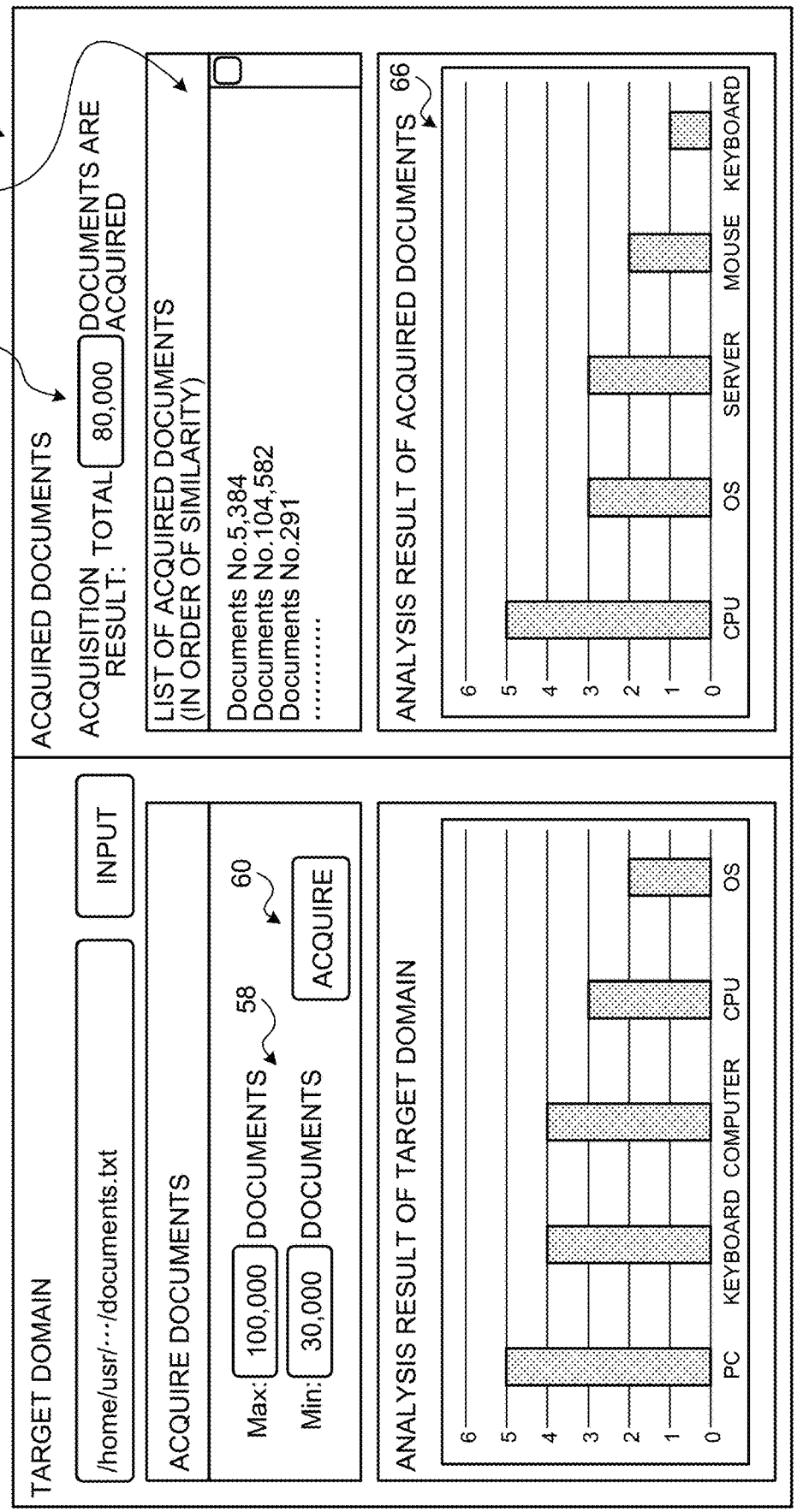
FIG. 8 is a diagram (4) illustrating the user interface according to the embodiment.

Upon completion of the search for the similar pre-training data, the information processing apparatus 100 provides a search result to the user. This will be described below with reference to FIG. 8. FIG. 8 is a diagram (4) illustrating the user interface according to the embodiment.

As illustrated in FIG. 8, the information processing apparatus 100 displays the number of pieces of similar pre-training data that are acquired through the search in a box 62. In the example in FIG. 8, it is indicated that the information processing apparatus 100 has retrieved "80,000" pieces of similar pre-training data as the search result.

Further, the information processing apparatus 100 may display a list of the pieces of similar pre-training data that are acquired through the search in a window 64 to provide the list to the user. For example, the information processing apparatus 100 displays the pieces of retrieved similar pre-training data in order of similarity to the pre-training data.

Furthermore, the information processing apparatus 100 may display a distribution of words in the pieces of similar pre-training data that are acquired through the search on a graph 66 to provide the distribution to the user. For example, the information processing apparatus 100 displays a statistic value of a distribution of words in a plurality of pieces of data that are retrieved as the similar pre-training data on the graph 66. Accordingly, the user is able to check, at a glance, whether the retrieved similar pre-training data is appropriate as the similar pre-training data.

As described above, the information processing apparatus 100 automatically searches for the similar pre-training data in the specific domain, and performs the pre-training using the retrieved similar pre-training data. In other words, even if the user is only able to prepare a small number of pieces of pre-training data, the information processing apparatus 100 automatically searches for the similar pre-training data to replenish the number of pieces of data, so that it is possible to effectively perform the pre-training. Furthermore, by providing the user interface 50, the information processing apparatus 100 simplifies reception of the search condition and provides information on the retrieved similar pre-training data to the user. With this configuration, the user is able to adjust quality and an amount of the similar pre-training data depending on a need of the user, so that it is possible to perform pre-training appropriate for the purpose of the user. For example, if the user wants to perform pre-training using only similar pre-training data with a high similarity or if the user wants to reduce a time of the training process, it is possible to reduce the upper limit number for the search. Further, if the user wants to preform pre-training using a larger number of pieces of similar pre-training data, it is possible to increase the upper limit number for the search.

In this manner, according to the information processing apparatus 100, even if an amount of pre-training data related to the specific domain is inadequate, it is possible to improve effects of the pre-training by automatically searching for the similar pre-training data.

1-2. Configuration of Information Processing Apparatus According to Embodiment

Figure 9:
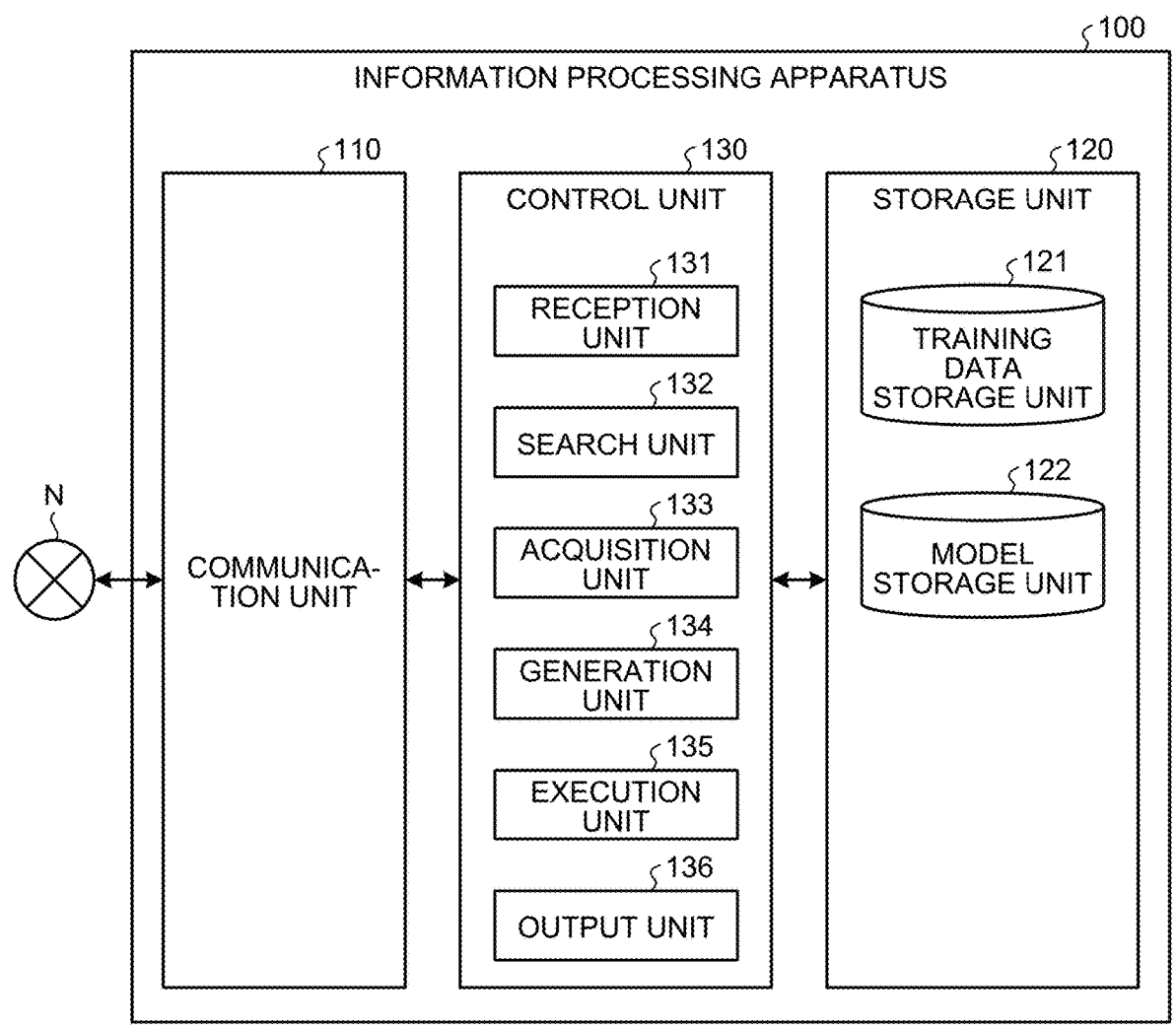
FIG. 9 is a diagram illustrating a configuration example of an information processing apparatus according to the embodiment of the present disclosure.

A configuration of the information processing apparatus 100 that performs the information processing according to the embodiment will be described below. FIG. 9 is a diagram illustrating a configuration example of the information processing apparatus 100 according to the embodiment of the present disclosure.

As illustrated in FIG. 9, the information processing apparatus 100 includes a communication unit 110, the storage unit 120, and a control unit 130. Meanwhile, the information processing apparatus 100 may include an input unit (for example, a keyboard, a mouse, or the like) that receives various kinds of operation from an administrator or the like who manages the information processing apparatus 100, or a display unit (for example, a liquid crystal display or the like) for displaying various kinds of information.

The communication unit 110 is realized by, for example, a network interface card (NIC) or the like. The communication unit 110 is connected to a network N (the Internet or the like) in a wired or wireless manner, and transmits and receives information to and from an external apparatus or the like via the network N.

The storage unit 120 is realized by, for example, a semiconductor memory element, such as a random access memory (RAM) or a flash memory, or a storage device, such as a hard disk or an optical disk. The storage unit 120 includes a training data storage unit 121 and a model storage unit 122. Each of the storage units will be described in sequence below.

The training data storage unit 121 stores therein training data that is used for training a neural network. For example, the training data is a pair of text data and correct answer data indicating a classification result of the text data, or the like. Further, the pre-training data is a pair of text data, information for masking a part of the text data, and correct answer data of the masked portion, or the like. Meanwhile, the training data may be acquired from an external server or the like as needed basis, instead of being stored in the information processing apparatus 100.

Figure 10:
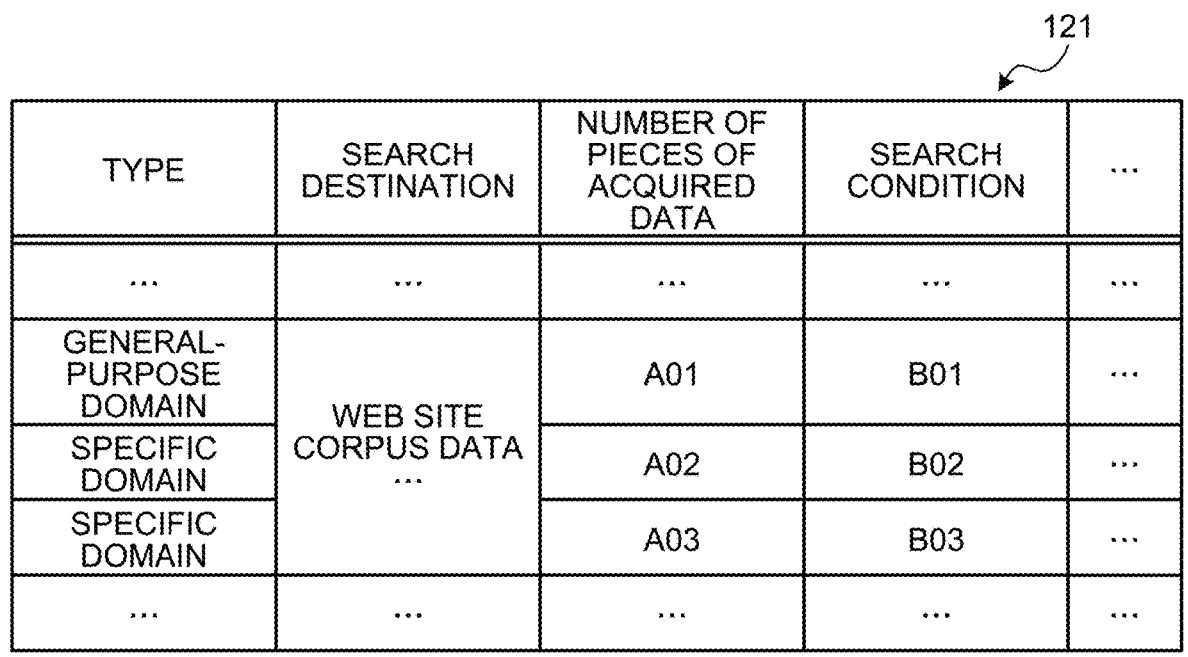
FIG. 10 is a diagram illustrating an example of a training data storage unit according to the embodiment of the present disclosure.

FIG. 10 illustrates an example of the training data storage unit 121 according to the embodiment. FIG. 10 is a diagram illustrating an example of the training data storage unit 121 according to the embodiment of the present disclosure. In the example illustrated in FIG. 10, the training data storage unit 121 has items of a "type", a "search destination", the "number of pieces of acquired data", a "search condition", and the like.

The "type" indicates a type that indicates whether the training data is the general-purpose domain or the specific domain. Meanwhile, a different kind of data is searched for each of fields with respect to the specific domain, and therefore, as illustrated in FIG. 10, in some cases, pre-training data for a plurality of specific domains may be stored.

The "search destination" indicates a database that serves as a search destination of training data. The search destination is not limited to a single database, but may be, for example, various servers that provide web sites on the web network. Further, the search destination may be a plurality of data servers or the like that have various kinds of corpus data.

The "number of pieces of acquired data" indicates the number of pieces of data that are acquired by the information processing apparatus 100 through a search or the like. The "search condition" indicates a search condition that is designated by, for example, the user or the like. Meanwhile, in the example in FIG. 10, the number of pieces of acquired data and the search condition are conceptually represented by "A01", "B01", and the like, but in reality, specific information, such as a value that is set as the number of pieces of data and the search condition, is stored in the items of the number of pieces of acquired data and the search condition.

Specifically, in the example illustrated in FIG. 10, it is indicated that a search destination of training data with a type of the "general-purpose domain" is a "website" and "corpus data", the number of pieces of acquired data is "A01", and the search condition is "B01".

Figure 11:
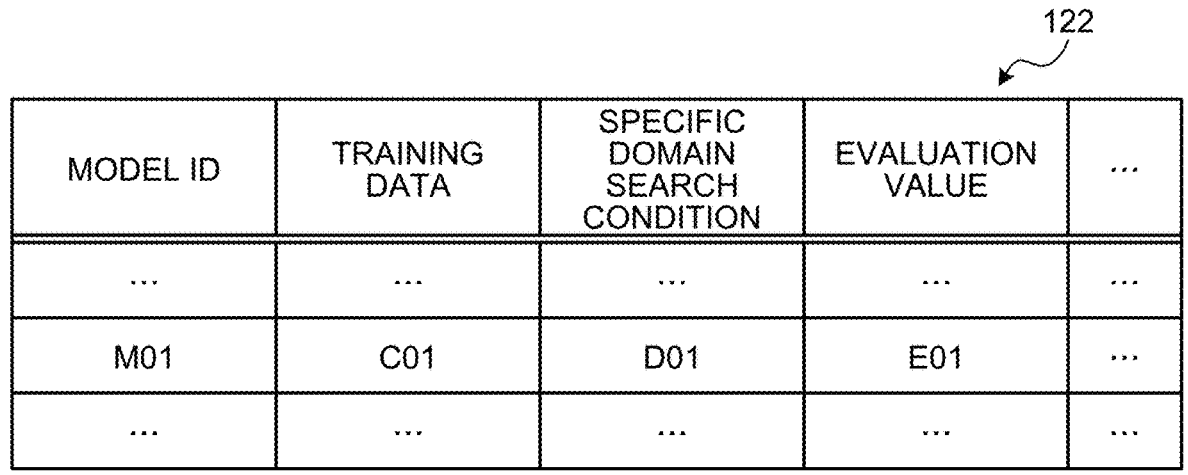
FIG. 11 is a diagram illustrating an example of a model storage unit according to the embodiment of the present disclosure.

The model storage unit 122 will be described below. The model storage unit 122 stores therein a model that is generated by the information processing apparatus 100. FIG. 11 illustrates an example of the model storage unit 122 according to the embodiment. FIG. 11 is a diagram illustrating an example of the model storage unit 122 according to the embodiment of the present disclosure. In the example illustrated in FIG. 11, the model storage unit 122 has items of a "model ID", "training data", a "specific domain search condition", an "evaluation value", and the like.

The "model ID" indicates identification information for identifying a model. The "training data" indicates pre-training data and training data that are used to generate the model. In FIG. 11, the item of the training data is conceptually represented by "C01", but in reality, details or the like of specific training data used for the training is stored in the item of the training data.

The "specific domain search condition" indicates a search condition related to the specific domain among pieces of pre-training data used to generate the model. In FIG. 11, the item of the specific domain search condition is conceptually represented by "D01", but in reality, sample pre-training data for defining the specific domain, an upper limit number and a lower limit number of similar pre-training data to be searched for, a server name of a search destination, or the like is stored in the item of the specific domain search condition.

The "evaluation value" indicates an evaluation value of the model. In FIG. 11, the item of the evaluation value is conceptually represented by "E01", but in reality, an index value indicating performance of the model is stored in the item of the evaluation value. Specifically, if the model performs a classification process, a value indicating an accuracy rate, the number of correct answers, or the like in the classification process is stored in the item of the evaluation value. The user is able to perform additional training of the model or perform adjustment by exchanging the training data by referring to the evaluation value.

In other words, in the example illustrated in FIG. 11, it is indicated that a model identified by a model ID of "M01" uses the training data of "C01" for the training, uses a specific domain search condition of "D01", and obtains an evaluation value of "E01".

Referring back to FIG. 9, explanation is continued. The control unit 130 is realized by causing, for example, a central processing unit (CPU), a micro processing unit (MPU), a graphics processing unit (GPU), or the like to execute a program (for example, an information processing program according to the present disclosure) that is stored in the information processing apparatus 100 by using a random access memory (RAM) or the like as a work area. Further, the control unit 130 may be a controller, and may be realized by an integrated circuit, such as an application specific integrated circuit (ASIC) or a field programmable gate array (FPGA).

As illustrated in FIG. 9, the control unit 130 includes a reception unit 131, a search unit 132, an acquisition unit 133, a generation unit 134, an execution unit 135, and an output unit 136, and implements or executes functions and operation of information processing as described below. Meanwhile, an internal configuration of the control unit 130 is not limited to the configuration as illustrated in FIG. 9, and other configurations may be adopted as long as the configurations are able to perform the information processing be described below by.

The reception unit 131 receives various kinds of information. For example, the reception unit 131 receives pre-training data that is data used for pre-training in machine learning, and a search condition for similar pre-training data that is data similar to the pre-training data.

For example, the reception unit 131 receives, as the pre-training data, a document including text data. Meanwhile, the reception unit 131 may receive a plurality of documents as the pre-training data.

Specifically, the reception unit 131 receives, as the pre-training data in the specific domain, a document designated by the user. In other words, a field that is related to a target process of the model and that is designated by the user is the specific domain, and data that is sampled as the pre-training data by the user is the pre-training data in the specific domain.

Further, the reception unit 131 receives, as the search condition, an upper limit number and the number of addition or subtraction for the similar pre-training data to be extracted from pieces of data stored in a searchable database.

For example, as illustrated in FIG. 5 to FIG. 8, the reception unit 131 receives the upper limit number and the number of addition or subtraction via the user interface in which the user is able to input an arbitrary value. With this configuration, the user is able to easily input the number of pieces of data as desired.

The search unit 132 searches for the similar pre-training data in accordance with the search condition received by the reception unit 131.

For example, if a certain document including text data is received as the pre-training data, the search unit 132 searches for, as the similar pre-training data, a document that is similar to the certain document.

Specifically, the search unit 132 searches for the similar pre-training data on the basis of a similarity between each piece of data stored in the searchable database and the pre-training data. Meanwhile, the searchable database is a document that can be crawled on the web network, published corpus data, or the like.

As one example, the search unit 132 searches for the similar pre-training data that is similar to the pre-training data on the basis of a word distribution of the pre-training data including text data. For example, the search unit 132 searches for the similar pre-training data that is similar to the pre-training data on the basis of a relationship among a type of a word that appears in the document, the number of appearances of the word, a frequency of the word, and the like.

Specifically, the search unit 132 generates a vector of each piece of the data stored in the searchable database and the pre-training data, and searches for the similar pre-training data on the basis of a cosine similarity between the vectors. For example, the search unit 132 generates a vector of each piece of data on the basis of a frequency (tf-idf) of a word in each piece of the data stored in the searchable database and the pre-training data. Then, the search unit 132 calculates a cosine similarity between the pre-training data and each piece of the data stored in the searchable database, and searches for the similar pre-training data on the basis of a calculation result.

Meanwhile, the method as described above is one example, and the search unit 132 may calculate a similarity between documents based on various known techniques. For example, the search unit 132 represents words in each of the documents by word vectors based on the technique of Word2vec, and calculates an average of the word vectors as a document vector corresponding to each of the documents. Then, the search unit 132 calculates a similarity between the documents based on a cosine similarity between the document vectors, the Euclidean distance between the vectors, or the like. Alternatively, the search unit 132 may directly calculate a vector of each of the documents based on the technique of Doc2vec.

The search unit 132 extracts the similar pre-training data from each piece of the data stored in the searchable database in accordance with the search condition designated by the user. Specifically, the search unit 132 searches for a certain number of pieces of the similar pre-training data, where the certain number meets the upper limit number and the number of addition or subtraction that are specified as the search condition.

Meanwhile, the search unit 132 may receive designation of a similarity in addition to destination of the upper limit number or the lower limit number. For example, if the similarity between the documents is represented by values from 0 to 1, the search unit 132 may search for only documents that exceed a certain value (for example, 0.5 or the like) that is set as a threshold.

Further, the search unit 132 may provide a search result to the user. For example, if the similar pre-training data is retrieved, the search unit 132 may display a result of comparison between a feature amount of the similar pre-training data and a feature amount of the pre-training data, on the user interface.

Specifically, the search unit 132 displays a word distribution of each piece of data as the feature amount of each piece of the pre-training data and the similar pre-training data on the user interface. More specifically, as illustrated in FIG. 8, the search unit 132 displays the feature amounts on the user interface in a mode in which a result of the word distribution of the pre-training data that is sampled by the user and a result of the word distribution of the retrieved similar pre-training data are compared. With this configuration, the user is able to recognize the feature of the retrieved similar pre-training data at a glance. Meanwhile, the feature amount such as the word distribution may be displayed as the graph 66 as illustrated in FIG. 8 or may be represented by text.

The acquisition unit 133 acquires various kinds of information. For example, the acquisition unit 133 acquires the similar pre-training data that is retrieved by the search unit 132. Further, the acquisition unit 133 acquires, from various databases, pieces of data that are randomly collectable, such as pre-training data in the general-purpose domain. For example, the acquisition unit 133 randomly crawls the web network and acquires pre-training data in the general-purpose domain.

The acquisition unit 133 stores the acquired data in the storage unit 120. For example, the acquisition unit 133 stores the acquired pre-training data and the acquired similar pre-training data in the training data storage unit 121. Further, the acquisition unit 133 may acquire various kinds of data from the storage unit 120 in accordance with a process performed by each of the processing units.

The generation unit 134 performs pre-training based on the similar pre-training data retrieved by the search unit 132, and generates a trained model by using a result obtained through the pre-training.

As one example, the generation unit 134 performs pre-training based on the document retrieved by the search unit 132, and generates, by using a result obtained through the pre-training, a classification model that outputs a classification result of a concept indicated by processing target text data upon input of the text data. For example, the generation unit 134 generates a classification model that classifies whether the input text data is a "favorable expression (positive)" or an "unfavorable expression (negative)".

Meanwhile, as illustrated in FIG. 2 and FIG. 3, the generation unit 134 may perform not only the pre-training using the similar pre-training data, but also pre-training using the pre-training data in the general-purpose domain. In other words, the generation unit 134 acquires a result of pre-training that is performed based on the general-purpose data including a larger amount of data than the similar pre-training data (corresponding to the process at Step S12 illustrated in FIG. 3). Thereafter, the generation unit 134 acquires a result of pre-training that is performed based on the similar pre-training data by using the result of the pre-training that is performed based on the general-purpose data (corresponding to the process at Step S14 illustrated in FIG. 3). Then, the generation unit 134 generates a trained model that fits the original purpose on the basis of models in which the above-described results are reflected. With this configuration, the generation unit 134 is able to generate a trained model that is able to perform a process with high accuracy when performing a process corresponding to the original purpose, as compared to a model for which the pre-training is not performed. Meanwhile, the generation unit 134 may omit the pre-training using the pre-training data in the general-purpose domain, and perform the pre-training only with the pre-training data in the specific domain (the pre-training data and the similar pre-training data sampled by the user). With this configuration, the generation unit 134 is able to improve a processing speed related to the generation.

The generation unit 134 stores the generated model in the model storage unit 122. Meanwhile, the generation unit 134 may update the generated model after a process is performed by the execution unit 135 (to be described later). For example, the generation unit 134 updates the model by using new training data in order to improve the evaluation value of the generated model.

The execution unit 135 performs information processing using the model generated by the generation unit 134. For example, if the model is the classification model, the execution unit 135 receives text data as input data, and inputs the text data to the model. Then, the execution unit 135 classifies the input data on the basis of a value output from the model.

The output unit 136 outputs various kinds of information. For example, the output unit 136 outputs a result of the information processing performed by the execution unit 135 to a display or the like. Further, the output unit 136 may output the evaluation value of the model on the basis of relativity between the result of the information processing performed by the execution unit 135 and the correct answer data. Further, the output unit 136 may store the output evaluation value in the model storage unit 122 in association with the model that is used for the information processing. Meanwhile, evaluation of the model is not limited to comparison with the correct answer data, but may be output on the basis of, for example, a time taken for the process of generating the model, a calculation speed or a calculation amount needed for the model to output a result, power consumption, or the like. Further, in the evaluation process as described above, it may be possible to appropriately use an existing software library or the like that is developed for training or evaluation of a neural network, or the like.

1-3. Flow of Information Processing According to Embodiment

Figure 12:
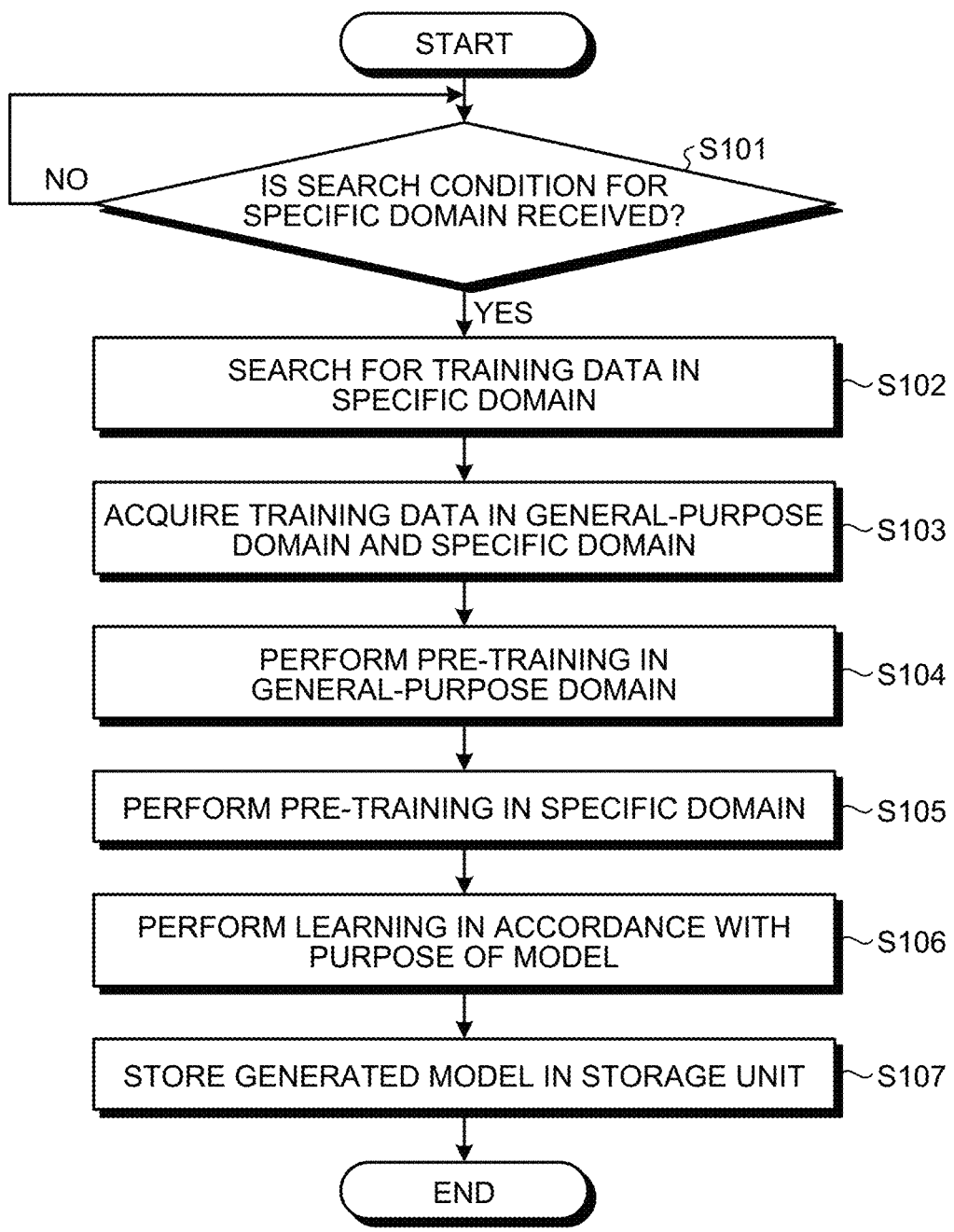
FIG. 12 is a flowchart (1) illustrating the flow of information processing according to the embodiment.

A flow of the information processing according to the embodiment will be described below with reference to FIG. 12 and FIG. 13. First, a flow of a generation process according to the embodiment of the present disclosure will be described with reference to FIG. 12. FIG. 12 is a flowchart (1) illustrating the flow of the information processing according to the embodiment of the present disclosure.

As illustrated in FIG. 12, the information processing apparatus 100 determines whether a search condition for the specific domain is received from the user (Step S101). If the search condition is not received (Step S101; No), the information processing apparatus 100 waits until the search condition is received.

In contrast, if the search condition is received (Step S101; Yes), the information processing apparatus 100 searches for training data (in other words, similar pre-training data) in the specific domain in accordance with the search condition (Step S102).

The information processing apparatus 100 acquires the retrieved training data in the specific domain and training data in the general-purpose domain (Step S103).

Subsequently, the information processing apparatus 100 performs pre-training data in the general-purpose domain (Step S104). Thereafter, the information processing apparatus 100 performs pre-training in the specific domain (Step S105).

Further, the information processing apparatus 100 performs training in accordance with the purpose of the model, by using a parameter that is obtained through the pre-training (Step S106). Then, the information processing apparatus 100 stores the generated model in the storage unit 120, and terminates the generation process (Step S107).

A flow of an execution process according to the embodiment of the present disclosure will be described below with reference to FIG. 13. FIG. 13 is a flowchart (2) illustrating the flow of the information processing according to the embodiment.

Figure 13:
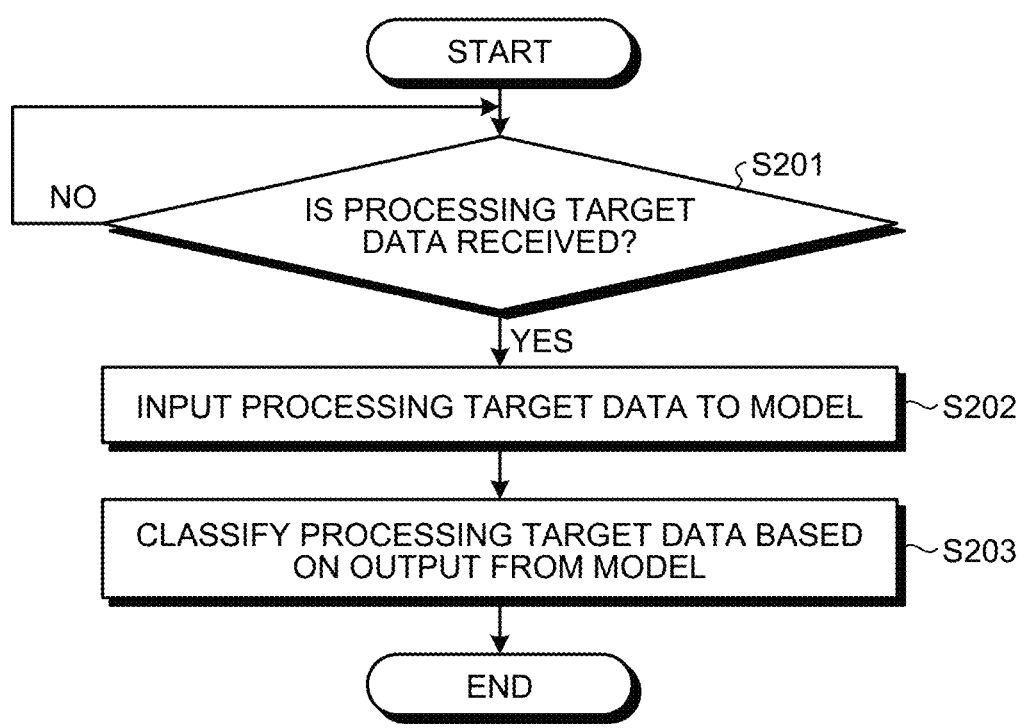
FIG. 13 is a flowchart (2) illustrating the flow of the information processing according to the embodiment.

As illustrated in FIG. 13, the information processing apparatus 100 determines whether processing target data is received (Step S201). If the processing target data is not received (Step S201; No), the information processing apparatus 100 waits until the processing target data is received.

In contrast, if the processing target data is received (Step S201; Yes), the information processing apparatus 100 inputs the processing target data to the model (Step S202). Then, the information processing apparatus 100 classifies the processing target data on the basis of output from the model (Step S203). Meanwhile, the information processing apparatus 100 may update the model or output a classification result to the display after Step S203.

1-4. Modification of Embodiment 1-4-1. Operation as Information Processing System In the embodiment as described above, the example has been described in which the information processing according to the present disclosure is performed by the information processing apparatus 100. However, the information processing according to the present disclosure may be performed by an information processing system that includes a terminal device used by the user and the information processing apparatus 100.

In this case, the terminal device may display the user interface as illustrated in FIG. 4 or transmit pre-training data held by the user to the information processing apparatus 100. The information processing apparatus 100 may analyze the pre-training data transmitted from the terminal device, search for the similar pre-training data, and generate a model. Further, when the user causes the model to perform the classification process, the user transmits processing target data to the information processing apparatus 100. The information processing apparatus 100 inputs the received processing target data to the model, and classifies the processing target data on the basis of an output value. Further, the information processing apparatus 100 transmits a classification result to the terminal device. The terminal device displays the received classification result.

In this manner, the information processing according to the present disclosure need not always be performed by only the information processing apparatus 100, but may be performed in cooperation with the information processing apparatus 100, the terminal device, and the like. In this case, the information processing apparatus 100 may be what is called a cloud server. In other words, the information processing according to the present disclosure is not limited to the examples as illustrated in the embodiment, but may be performed by an information processing system including various apparatuses.

1-4-2. Application to Processing Other than Natural Language Processing

In the embodiments as descried above, the example has been described in which the pre-training data is text data and a process performed by the model is natural language processing. However, the information processing according to the present disclosure is applicable to a field other than the natural language processing.

For example, the information processing according to the present disclosure may be applied to an image recognition process. In this case, the information processing apparatus 100 performs pre-training on image processing for compensating for a partly masked portion by using, as the pre-training data in the general-purpose domain, image data that is randomly retrieved. Further, the information processing apparatus 100 performs pre-training by using, as the pre-training data in the specific domain, image data that is similar to a target to be classified. Then, the information processing apparatus 100 performs supervised learning that fits to the original purpose (for example, a process for classifying whether an animal included in an image is a dog or not, or the like), on the basis of a parameter that is obtained through the pre-training. With this configuration, the information processing apparatus 100 is able to obtain a model that has more improved performance than a model that is trained without pre-training. Meanwhile, the information processing apparatus 100 may generate a model that performs a voice recognition process, instead of image processing.

1-4-3. Application to Model Other than Classification Model

In the embodiment as described above, the example has been described in which a model is generated as the classification model that is designed to classify whether text data is favorable or unfavorable. However, the model generated through the information processing according to the present disclosure is not limited to a process for classifying between two values, but may be generated as a model that performs various kinds of well-known information processing.

2. Other Embodiments

Processes according to each of the embodiments as described above may be performed in various different modes other than each of the embodiments as described above.

For example, of the processes described in each the embodiments as described above, all or part of a process described as being performed automatically may also be performed manually. Alternatively, all or part of a process described as being performed manually may also be performed automatically by known methods. In addition, the processing procedures, specific names, and information including various kinds of data and parameters illustrated in the above-described document and drawings may be arbitrarily changed unless otherwise specified. For example, various kinds of information illustrated in each of the drawings are not limited to the information as illustrated in the drawings.

Further, each of the structural elements illustrated in the drawings is functionally conceptual and does not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions.

Furthermore, the embodiments and the modifications as described above may be combined appropriately within a scope that does not contradict the processing contents.

Moreover, the effects described in this specification are merely illustrative or exemplified effects, and are not limitative, and, other effects may be achieved.

3. Effects of Information Processing Apparatus According to Present Disclosure As described above, the information processing apparatus according to the present disclosure (the information processing apparatus 100 in the embodiment) includes a reception unit (the reception unit 131 in the embodiment), a search unit (the search unit 132 in the embodiment), and a generation unit (the generation unit 134 in the embodiment). The reception unit receives pre-training data that is data used for pre-training in machine learning, and a search condition for similar pre-training data that is data similar to the pre-training data. The search unit searches for the similar pre-training data in accordance with the search condition. The generation unit performs pre-training based on the retrieved similar pre-training data, and generates a trained model by using a result obtained through the pre-training.

In this manner, the information processing apparatus according to the present disclosure compensates for the similar pre-training data that is similar to the pre-training data by the search, so that even if an amount of pre-training data related to the specific domain is inadequate, it is possible to improve effects of the pre-training.

Furthermore, the reception unit receives, as the pre-training data, a certain document that includes text data. The search unit searches for, as the similar pre-training data, a document that is similar to the certain document.

In this manner, the information processing apparatus according to the present disclosure is able to effectively search for data that is similar to the pre-training data by using the similarity between the documents.

Moreover, the generation unit performs pre-training based on the document that is retrieved by the search unit, and generates, by using a result obtained through the pre-training, a classification model that outputs a classification result of a concept indicated by processing target data upon input of the text data.

In this manner, the information processing apparatus according to the present disclosure is able to improve accuracy of the classification model to be generated, by performing the pre-training on the classification model by using the retrieved similar pre-training data.

Furthermore, the generation unit generates the trained model by using a result of pre-training that is performed based on general-purpose data including a larger amount of data than the similar pre-training data, and a result of pre-training that is performed based on the similar pre-training data by using the result of the pre-training that is performed based on the general-purpose data.

In this manner, the information processing apparatus according to the present disclosure includes a configuration that preforms pre-training in the specific domain after performing pre-training in the general-purpose domain in the learning process, so that it is possible to further improve accuracy of the model to be generated.

Moreover, the search unit searches for the similar pre-training data on the basis of a similarity between each piece of data stored in a searchable database and the pre-training data.

In this manner, the information processing apparatus according to the present disclosure is able to retrieve a number of pieces of similar pre-training data that can hardly be acquired by an individual user, by searching for the similar pre-training data in a searchable database, such as a web network or published corpus data.

Furthermore, the search unit searches for similar pre-training data that is similar to pre-training data including text data, on the basis of a word distribution of the pre-training data.

In this manner, the information processing apparatus according to the present disclosure is able to effectively search for data in a specific field by determining a similarity between pieces of data on the basis of the word distributions. With this configuration, the information processing apparatus is able to search for and acquire a large number of pieces of the similar pre-training data in the specific domain.

Moreover, the search unit generates a vector of each piece of data stored in the searchable database and the pre-training data, and searches for the similar pre-training data on the basis of a cosine similarity between the vectors.

In this manner, the information processing apparatus according to the present disclosure is able to effectively search for the data that is similar to the pre-training data sampled by the user, by determining the similarity between the pieces of data using the vectors.

Furthermore, the reception unit receives, as the search condition, an upper limit number and the number of addition or subtraction for the similar pre-training data to be extracted from the pieces of data stored in the searchable database. The search unit searches for searches for a certain number of pieces of the similar pre-training data, where the certain number meets the upper limit number and the number of addition or subtraction that are specified as the search condition.

In this manner, the information processing apparatus according to the present disclosure is able to perform pre-training a certain number of times as desired by the user, by searching for a certain number of pieces of similar pre-training data as designated by the user.

Moreover, the reception unit receives the upper limit number and the number of addition or subtraction via an interface that allows the user to input an arbitrary value.

In this manner, the information processing apparatus according to the present disclosure is able to simplify reception of the search condition by receiving a request from the user by using the interface, so that it is possible to improve usability for the user who uses the information processing apparatus.

Furthermore, the search unit, when retrieving the similar pre-training data, displays a result of comparison between a feature amount of the similar pre-training data and a feature amount of the pre-training data on the interface.

In this manner, the information processing apparatus according to the present disclosure is able to provide, in an easily understandable manner, what kind of data is retrieved to the user by providing the feature amount of the retrieved similar pre-training data to the user.

Moreover, the search unit displays, as the feature amounts of the pre-training data and the similar pre-training data, certain display indicating word distributions of the respective pieces of data on the interface.

In this manner, the information processing apparatus according to the present disclosure is able to provide, in an easily understandable manner, contents or the like of data that is retrieved as the similar pre-training data, by displaying information indicating the word distribution of the similar pre-training data.

4. Hardware Configuration

Figure 14:
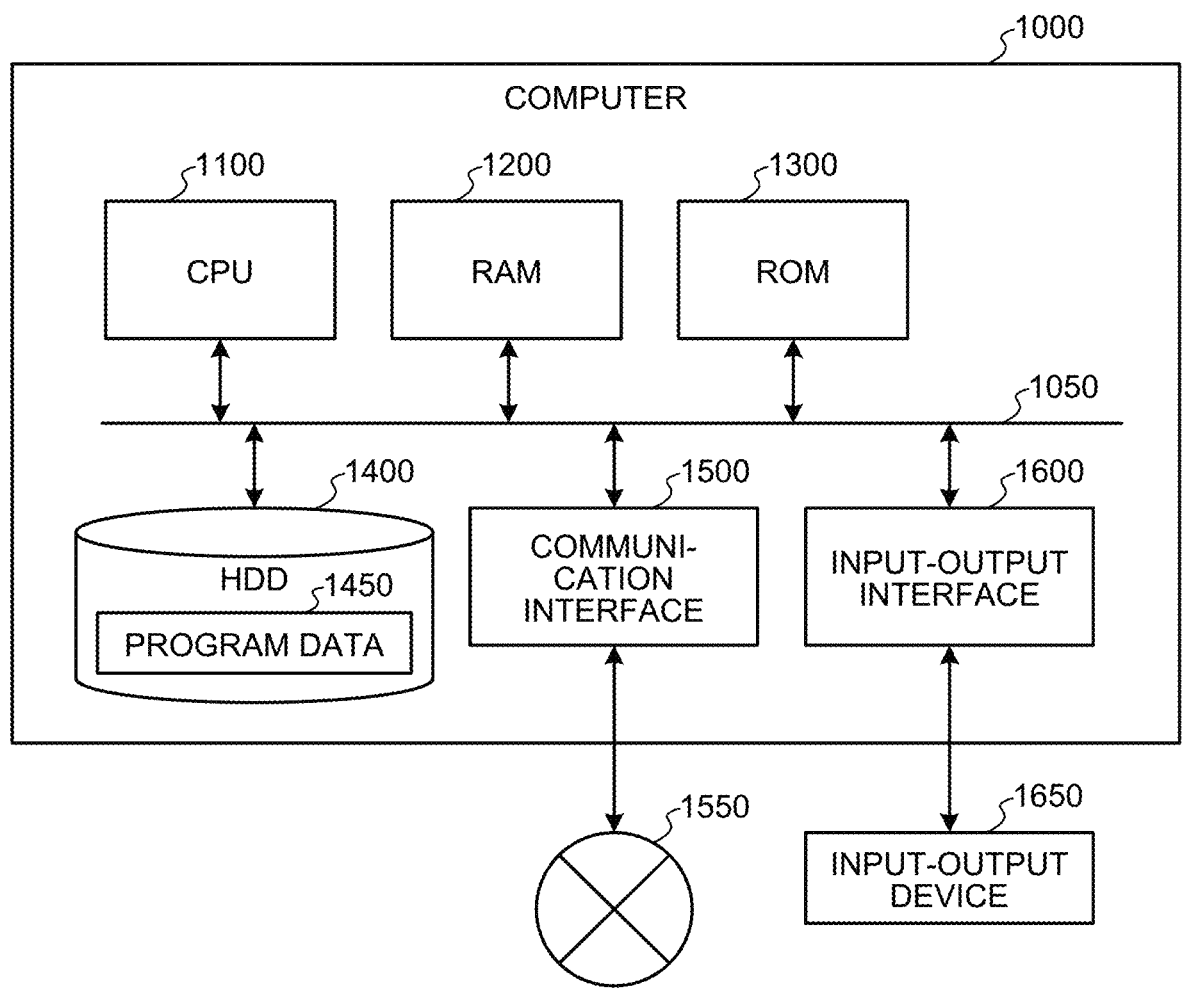
FIG. 14 is a hardware configuration diagram illustrating an example of a computer that implements functions of the information processing apparatus.

An information equipment, such as the information processing apparatus 100 according to each of the embodiments as described above, is realized by, for example, a computer 1000 as illustrated in FIG. 14. In the following, explanation will be given by using the information processing apparatus 100 according to the embodiment as an example. FIG. 14 is a hardware configuration diagram illustrating an example of the computer 1000 that implements the functions of the information processing apparatus 100. The computer 1000 includes a CPU 1100, a RAM 1200, a read only memory (ROM) 1300, a hard disk drive (HDD) 1400, a communication interface 1500, and an input-output interface 1600. All of the units of the computer 1000 are connected to one another via a bus 1050.

The CPU 1100 operates based on a program stored in the ROM 1300 or the HDD 1400, and controls each of the units. For example, the CPU 1100 loads the program stored in the ROM 1300 or the HDD 1400 onto the RAM 1200 and performs processes corresponding to various programs.

The ROM 1300 stores therein a boot program, such as basic input output system (BIOS), which is executed by the CPU 1100 at the time of activation of the computer 1000, a program that is dependent on the hardware of the computer 1000, and the like.

The HDD 1400 is a computer readable recording medium that stores therein, in a non-transitory manner, a program to be executed by the CPU 1100, data used by the program, and the like. Specifically, the HDD 1400 is a recording medium that stores therein an information processing program according to the present disclosure, which is one example of program data 1450

The communication interface 1500 is an interface for allowing the computer 1000 to connect to an external network 1550 (for example, the Internet). For example, the CPU 1100 receives data from a different device or transmits data generated by the CPU 1100 to the different device via the communication interface 1500.

The input-output interface 1600 is an interface for connecting an input-output device 1650 and the computer 1000. For example, the CPU 1100 receives data from an input device, such as a keyboard or a mouse, via the input-output interface 1600. Further, the CPU 1100 transmits data to an output device, such as a display, a speaker, or a printer, via the input-output interface 1600. Furthermore, the input-output interface 1600 may also function as a media interface that reads a program or the like that is stored in a predetermined recording medium (media). Examples of the media include an optical recording medium, such as a digital versatile disk (DVD) or a phase change rewritable disk (PD), a magneto optical recording medium, such as a magneto-optical disk (MO), a tape medium, a magnetic recording medium, and a semiconductor memory.

For example, if the computer 1000 functions as the information processing apparatus 100 according to the embodiment, the CPU 1100 of the computer 1000 implements the functions of the control unit 130 and the like by executing the information processing program that is loaded on the RAM 1200. Further, the HDD 1400 stores therein the information processing program according to the present disclosure and the data that is stored in the storage unit 120. Meanwhile, while the CPU 1100 reads the program data 1450 from the HDD 1400 and executes the program data 1450, the CPU 1100 may acquire the program from a different device via the external network 1550, as another example.

Additionally, the present technology may also be configured as below.

(1)

An information processing apparatus comprising:

a reception unit that receives pre-training data that is data used for pre-training in machine learning, and a search condition for similar pre-training data that is data similar to the pre-training data;

a search unit that searches for similar pre-training data in accordance with the search condition; and a generation unit that performs pre-training based on the retrieved similar pre-training data, and generates a trained model by using a result obtained through the pre-training.

(2)

The information processing apparatus according to (1), wherein the reception unit receives, as the pre-training data, a certain document including text data, and the search unit searches for, as the similar pre-training data, a document that is similar to the certain document.

(3)

The information processing apparatus according to (2), wherein the generation unit performs pre-training based on the document that is retrieved by the search unit, and generates, by using a result obtained through the pre-training, a classification model that outputs a classification result of a concept indicated by processing target text data upon input of the text data.

(4)

The information processing apparatus according to any one of (1) to (3), wherein the generation unit generates the trained model by using a result of pre-training that is performed based on general-purpose data including a larger amount of data than the similar pre-training data, and a result of pre-training that is performed based on the similar pre-training data by using the result of the pre-training that is performed based on the general-purpose data.

(5)

The information processing apparatus according to any one of (1) to (4), wherein the search unit searches for the similar pre-training data on the basis of a similarity between each piece of data stored in a searchable database and the pre-training data.

(6)

The information processing apparatus according to (5), wherein the search unit searches for similar pre-training data that is similar to the pre-training data including text data, on the basis of a word distribution of the pre-training data.

(7)

The information processing apparatus according to (6), wherein the search unit generates a vector of each piece of the data stored in the searchable database and the pre-training data, and searches for the similar pre-training data on the basis of a cosine similarity between the vectors.

(8)

The information processing apparatus according to any one of (5) to (7), wherein the reception unit receives, as the search condition, an upper limit number and number of addition or subtraction for the similar pre-training data to be extracted from the pieces of data stored in the searchable database, and the search unit searches for a certain number of pieces of the similar pre-training data, the certain number meeting the upper limit number and the number of addition or subtraction.

(9)

The information processing apparatus according to (8), wherein the reception unit receives the upper limit number and the number of addition or subtraction via an interface that allows a user to input an arbitrary value.

(10)

The information processing apparatus according to (9), wherein the search unit, when retrieving the similar pre-training data, displays a result of comparison between a feature amount of the similar pre-training data and a feature amount of the pre-training data on the interface.

(11)

The information processing apparatus according to (10), wherein the search unit displays, as the features amounts of the pre-training data and the similar pre-training data, certain display indicating word distributions of the respective pieces of data on the interface.

(12)

An information processing method implemented by a computer, the information processing method comprising:

receiving pre-training data that is data used for pre-training in machine learning, and a search condition for similar pre-training data that is data similar to the pre-training data;

retrieving similar pre-training data in accordance with the search condition;

performing pre-training based on the retrieved similar pre-training data; and generating a trained model by using a result obtained through the pre-training.

(13)

An information processing program that causes a computer to function as:

a reception unit that receives pre-training data that is data used for pre-training in machine learning, and a search condition for similar pre-training data that is data similar to the pre-training data;

a search unit that searches for similar pre-training data in accordance with the search condition; and a generation unit that performs pre-training based on the retrieved similar pre-training data, and generates a trained model by using a result obtained through the pre-training.

REFERENCE SIGNS LIST

100 information processing apparatus
110 communication unit
120 storage unit
121 training data storage unit
122 model storage unit
130 control unit
131 reception unit
132 search unit
133 acquisition unit
134 generation unit
135 execution unit
136 output unit

The invention claimed is:

1. An information processing apparatus for generating a trained model for classifying input data in a certain category comprising:

circuitry configured to receive from a user pre-training data that is data belonging to a specific domain and used for pre-training in machine learning, and a search condition to search similar pre-training data that is data similar to the pre-training data, the specific domain being a grow of data relatin to the certain category, search and retrieve the similar pre-training data in accordance with the pre-training data and the search condition;

perform pre-training based on the similar pre-training data that is retrieved, and generate a pre-trained model by using a result Obtained through the pre-training; and perform supervised learning over the pre-trained model using teaching data to learn classif ring the input data in the certain category and generate the trained model for classifing the input data in the certain category through the supervised learning.

2. The information processing apparatus according to cia wherein the circuitry is further configured to receive, as the pre-training data, a certain document including text data, and search and retrieve, as the si ilar pre-training data, a document that is similar to the certain document.

3. The information processing apparatus according to claim 1, wherein the circuitry is further configured to perform general pre-training before the pre-training, based on general-purpose data including a larger amount of data than the similar pre-training data, and generate the pre-trained model through both of the general pre-training and the pre-training.

4. The information processing apparatus according to claim 1, wherein the circuitry is further configured to search and retrieve the similar pre-training data on the basis of a similarity between each of pieces of data stored in a searchable database and the pre-training data.

5. The information processing apparatus according to claim 4, wherein the pre-training data includes text data and the circuitry is further configured to search and retrieve the similar pre-training data, on the basis of a word distribution of the pre-training data.

6. The information processing apparatus according to claim 5, wherein the circuitry is further configured to generate a first vector of each the pieces of the data stored in the searchable database and a second vector of the pre-training data, and to search and retrieve the similar pre-training data on the basis of a cosine similarity between the first vector and the second vector.

7. The information processing apparatus according to claim 4, wherein the circuit is further configured to receive, as the search condition, an upper limit number and n a lower limit number of pieces of the similar pre-training data to be extracted from the pieces of data stored in the searchable: database, and search and retrieve a certain number of pieces of the similar pre-training data, the certain number being within a range between the upper limit number and the lower limit number.

8. The information processing apparatus according to claim 7, wherein
the circuitry is further configured to receive the upper limit number and the lower limit number via an interface that allows the user to input an arbitrary value.

9. The information processing apparatus according to claim 8, wherein
the circuitry, when retrieving the similar pre-training data, is further configured to display a result of comparison between a feature amount of the similar pre-training data and a feature amount of the pre-training data on the interface.

10. The information processing apparatus according to claim 9, wherein
the circuitry is further configured to display, as the amounts feature amount of each of the pre-training data and the similar pre-training data, certain display indicating word distributions of the pre-training data and the similar pre-training data on the interface.

11. The information processing apparatus according to claim 1, wherein each of the pre-training data and the similar pre-training data is a pair of text data having a masked portion therein and a correct answer to fill in the masked portion.

12. An information processing method for generating a trained model for classifying input data in a certain category, implemented by a computer, the information processing method comprising:

receiving from a user pre-training data that is data belonging to a specific domain and used for pre-training in machine learning, and a search condition to search similar pre-training data that is data similar to the pre-training data, the specific domain being a group of data relating to the certain category;

searching and retrieving the similar pre-training data in accordance with the pre- training data and the search condition;

performing pre-training based on the similar pre-training data that is retrieved;

generating a pre-trained model through the pre-training; and performing supervised learning over the pretrained model using teaching data to learn classifying the input data in the certain category: and generating the trained model for classifying the input data in the certain category through the supervised learning.

13. The information processing method according to claim 12, wherein each of the pre-training data and the similar pre-training data is a pair of text data having a masked portion therein and a correct answer to fill in the masked portion.

\* \* \* \* \*